(No Model.)

G. B. SELLERS.
SPRING MOTOR.

No. 537,650. Patented Apr. 16, 1895.

Witnesses:
J. B. McGirr.
Thos. A. Aiton.

Inventor:
George B. Sellers
by Robt. Aiton
Atty.

UNITED STATES PATENT OFFICE.

GEORGE B. SELLERS, OF MARSHALLTOWN, IOWA.

SPRING-MOTOR.

SPECIFICATION forming part of Letters Patent No. 537,650, dated April 16, 1895.

Application filed August 6, 1894. Serial No. 519,542. (No model.)

*To all whom it may concern:*

Be it known that I, GEORGE B. SELLERS, a citizen of the United States, residing at Marshalltown, in the county of Marshall and State of Iowa, have invented certain new and useful Improvements in Spring-Motors; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in spring motors and has for its object new and novel means for successively calling into action the separate operating springs.

It further consists in novel means for connecting the springs with the main shaft of the motor.

It further consists of the combination and arrangement of parts hereinafter set forth.

Figure 1:
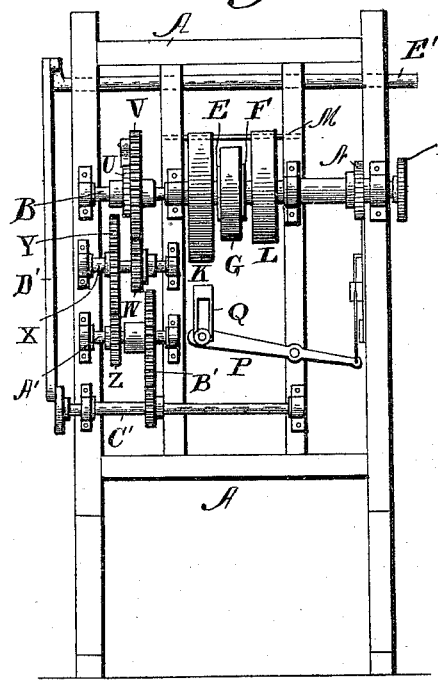
Figure 2:
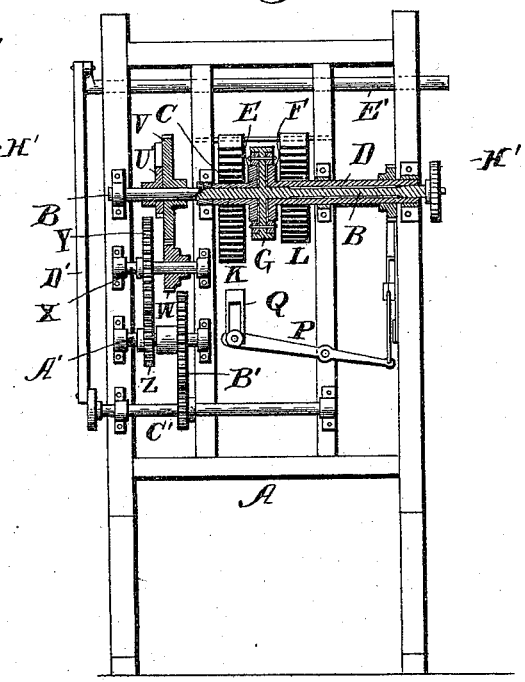
Figure 3:
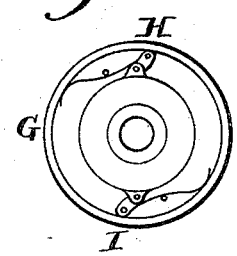
Figure 4:
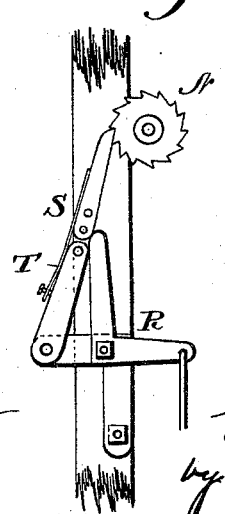
Figure 5:

In the drawings, Figure 1 represents a front view of a motor embodying my invention. Fig. 2 represents a vertical sectional view thereof. Fig. 3 represents an end view of a detail portion of the motor on an enlarged scale. Fig. 4 represents a front view of the tripping mechanism for releasing the second spring. Fig. 5 represents a front view of a key for winding the springs.

In the drawings like characters denote similar parts of the machine.

A designates a frame and B a main shaft mounted thereon. C and D designate sleeves loosely mounted on said shaft and provided at their adjacent ends with the wheels E and F respectively. Secured on the shaft B and between the said wheels E and F, is a wheel G, which has connected with each of its opposite sides, the spring pressed pawls H and I, which bear against the peripheries of said wheels E and F.

K and L designate coil springs which are secured at one end respectively to the sleeves C and D, and at their other ends to the cross bar M on the frame A. On the sleeve D, which is the longer of the two, is secured a ratchet wheel N, whereby the said sleeve is prevented from turning until required.

On the frame A is pivoted a lever P, having at one end an arm Q adapted to be engaged or contacted with by the spring K when the latter is wholly unwound. To the other end of the lever P is connected one limb of a bell crank lever R also pivotally attached to the frame A, and having its other limb bearing against the joint of a two-part pawl S, which latter engages the ratchet N and normally prevents its rotation. The pawl S is formed of two hinged parts having a spring T, connected with one end and bearing against the other for keeping them in line and the pawl in engagement with the ratchet.

Secured on one end of the shaft B is a ratchet wheel U, which is engaged by a pawl on the gear wheel V loosely mounted on the said shaft. The wheel V meshes with a pinion W on the shaft X, the latter carrying a gear wheel Y meshing with a pinion Z on the shaft A', which latter carries a gear wheel B' meshing with a pinion on the shaft C'; said shafts X, A', and C', being journaled on the frame A. Eccentrically connected with the shaft C' is the rod D' which is also connected with a shaft E', journaled in the upper part of the frame.

The manner of operation of the machine is easily understood. The springs being wound, the spring L is first held coiled, until as hereinafter described. As the spring K unwinds, the sleeve C with its wheel E slowly rotates, and the latter engaging the pawls H on the one side of the wheel G cause the latter with the shaft B to rotate, the sleeve D remaining at rest. The rotation of the shaft B imparts motion through the hereinbefore described train of gearing to the shaft C' and thus to the rod D' and shaft E'. When the spring K is unwound it comes in contact with the arm Q of the lever P and so actuates the same and thereby the bell crank lever R that the pawl S is tripped thereby releasing it from the ratchet N so that the spring L is permittted to turn its sleeve D and thereby the wheel G and the shaft B, thus adding to the life of the rotation of said shaft. The pawls H and I are formed of knuckle joints and have springs bearing against them so as to keep them in engagement with the peripheries of said wheels E and F.

On one end of the shaft B is a ratchet H', which in connection with a key J' having an opening K' therein and provided with a pawl L', is employed in winding the springs; both of said springs being wound at one time.

It will be seen that the parts as described are simple in construction, easily replaced if broken, and durable in character, while forming an efficient machine.

Having thus described my invention, what I desire to secure and obtain by Letters Patent is—

1. A spring motor having a shaft with a wheel connected therewith, pawls on the sides of said shaft wheel, sleeves loosely mounted on said shaft and having wheels on their adjacent ends engaged by the pawls on said shaft wheel, springs operating said sleeves, a ratchet on one of said sleeves, a lever with an arm engaged by one of said springs, a pawl engaging said ratchet and a bell crank lever connected with said lever and bearing against said pawl, said parts being combined substantially as described.

2. In a spring motor, a shaft, with a wheel connected therewith, two sleeves loosely mounted on said shaft, wheels connected with said sleeves, pawls on the sides of said shaft wheels bearing on the peripheries of said sleeve wheels, springs connected with said sleeves, a ratchet on one of said sleeves, a lever with arm engaged by one of said springs, a two-part pawl engaging said ratchet, a bell-crank lever connected with said lever and bearing against one of the parts of said pawl, said parts being combined substantially as described.

3. A spring motor, consisting of a frame, a shaft mounted thereon, and having a wheel connected therewith, sleeves loosely mounted on said shaft and having wheels connected therewith at their adjacent ends, pawls on said shaft wheel bearing against the peripheries of said sleeve wheels, a ratchet on one of said sleeves, a two-part pawl engaging said ratchet, releasing mechanism operating by contact with one of said springs for said pawl a second shaft, a train of gearing connecting said first shaft with said second shaft and a driving shaft having a rod connecting it with said second shaft said parts being combined substantially as described.

In testimony whereof I affix my signature in presence of two witnesses.

GEORGE B. SELLERS.

Witnesses:
WILLIAM S. REED,
JOHN A. BOWMAN.